US010246146B1

(12) United States Patent
Choquette

(10) Patent No.: US 10,246,146 B1
(45) Date of Patent: Apr. 2, 2019

(54) FIFTH WHEEL HITCH

(71) Applicant: Automatic Equipment Manufacturing Company, Pender, NE (US)

(72) Inventor: Paul Choquette, Lincoln, NE (US)

(73) Assignee: Automatic Equipment Manufacturing Company, Pender, NE (US)

( * ) Notice: Subject to any disclaimer, the term of this patent is extended or adjusted under 35 U.S.C. 154(b) by 0 days.

(21) Appl. No.: 15/482,712

(22) Filed: Apr. 8, 2017

(51) Int. Cl.
*B62D 53/08* (2006.01)
*B60D 1/01* (2006.01)
*B60D 1/36* (2006.01)

(52) U.S. Cl.
CPC ......... *B62D 53/0842* (2013.01); *B60D 1/015* (2013.01); *B60D 1/36* (2013.01)

(58) Field of Classification Search
CPC ....... B60D 53/0842; B60D 1/015; B60D 1/36
See application file for complete search history.

(56) References Cited

U.S. PATENT DOCUMENTS

| | | | |
|---|---|---|---|
| 2,077,484 A | 4/1937 | King | |
| 2,348,977 A | 5/1944 | Ketel | |
| 2,772,895 A | 12/1956 | Steeves et al. | |
| 4,928,987 A * | 5/1990 | Hunger | B62D 53/0885 280/433 |
| 5,257,796 A | 11/1993 | Thorwall et al. | |
| 6,092,825 A | 7/2000 | Flater | |
| 6,722,684 B1 * | 4/2004 | McAllister | B60D 1/06 177/146 |
| 7,152,869 B2 | 12/2006 | Dupay et al. | |
| 7,931,291 B2 | 4/2011 | Mann | |
| 8,210,558 B2 | 7/2012 | Mann et al. | |
| 9,145,178 B2 | 9/2015 | Erickson et al. | |
| 9,327,782 B2 | 5/2016 | Alldredge et al. | |
| 9,849,738 B2 * | 12/2017 | Guthard | B60D 1/015 |
| 2007/0235980 A1 * | 10/2007 | Crawley | B62D 53/0842 280/435 |
| 2012/0018977 A1 * | 1/2012 | Stanifer | B62D 53/0885 280/433 |
| 2012/0018978 A1 | 1/2012 | McCoy et al. | |
| 2012/0018979 A1 * | 1/2012 | McCoy | B62D 53/08 280/441.1 |

* cited by examiner

*Primary Examiner* — Tony H Winner
*Assistant Examiner* — Marlon A Arce
(74) *Attorney, Agent, or Firm* — Donald R. Schoonover

(57) ABSTRACT

A fifth wheel hitch having a base assembly mounted to a bed of a towing vehicle, an intermediate assembly mounted to the base assembly, and a hitch head assembly which reduces or entirely eliminates the need for a lubricant, has jaws with mated, intermeshing teeth, and a locking mechanism which clearly indicates whether or not a kingpin of a fifth wheel trailer is properly connected to the fifth wheel hitch. The fifth wheel hitch is easily uninstalled into separate light-weight modules for re-installation on another towing vehicle.

11 Claims, 3 Drawing Sheets

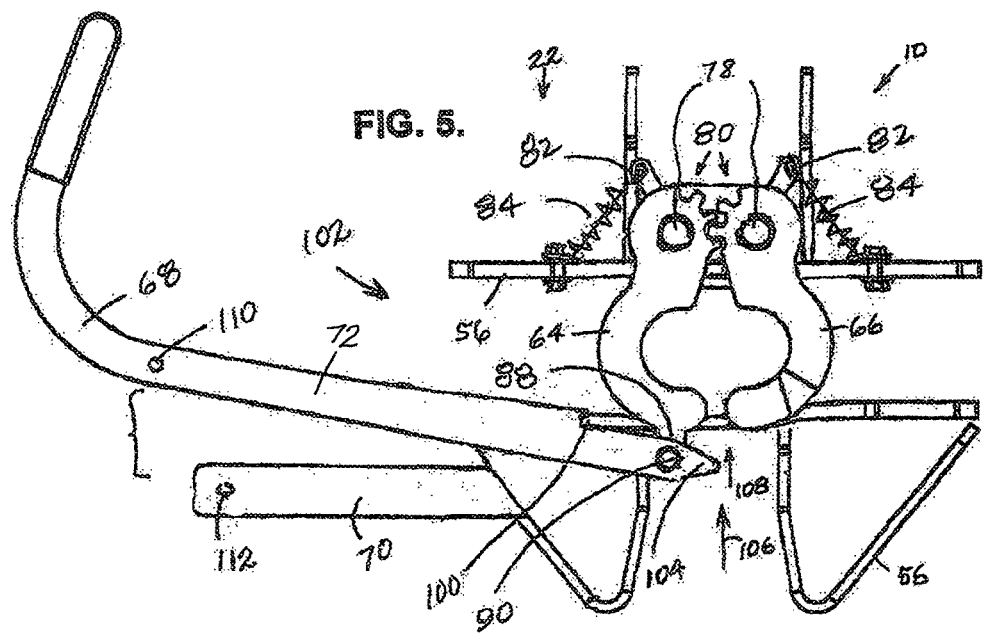
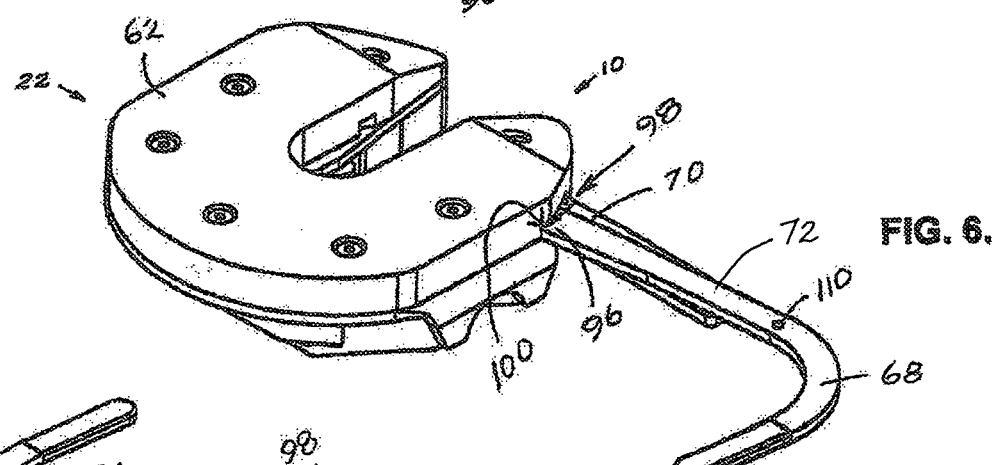
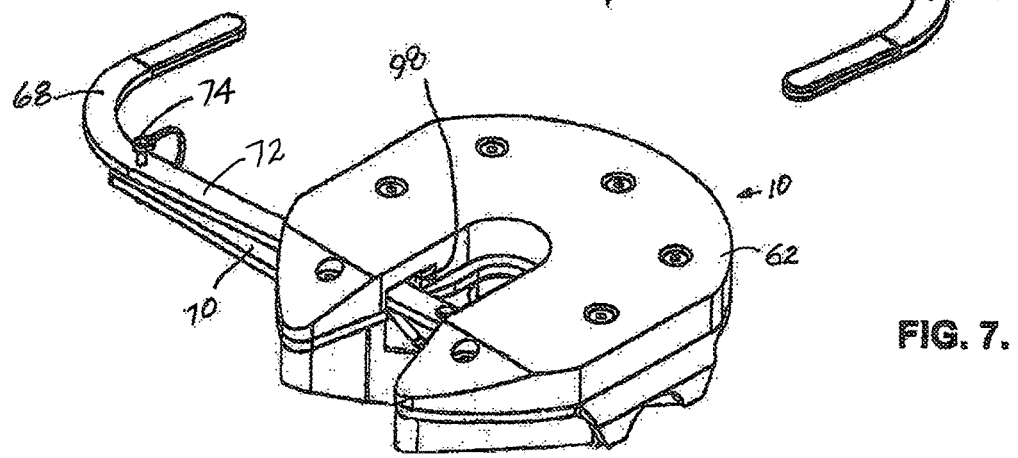

FIFTH WHEEL HITCH

BACKGROUND OF THE INVENTION

1. Field of the Invention

The present invention relates to towing accessories and, more particularly without limitation, to hitches for connecting a fifth wheel trailer to a towing vehicle.

2. Description of the Related Art

A fifth wheel hitch is used for connecting a fifth wheel trailer to a towing vehicle, such as a pickup truck or flat-bed truck. A fifth wheel hitch generally includes various components. For example, the lowermost component of a fifth wheel hitch generally includes a base secured to the bed of the truck. An uppermost component of a fifth wheel hitch generally includes a hitch head mounted on an intermediate platform, which in turn is mounted on the base. The hitch head includes a rearward-facing throat configured to receive the kingpin of a fifth wheel trailer.

As an example of a fifth wheel hitch, see United States Patent Application Publication Number 2016/0167721, to Nicholas Erickson, titled "Fifth Wheel Hitch and Associated Systems and Methods", and published Jun. 16, 2016, which is incorporated herein by reference.

Some prior art fifth wheel hitches utilize a system wherein the jaws automatically lock around the kingpin of a fifth wheel hitch trailer. Unfortunately, such a system may fail to properly operate and/or may give a false positive signal that the automatic locking system will properly function. The consequences of such an event could obviously result in extreme damages and injuries, including fatalities.

What is needed is a fifth wheel hitch which clearly and positively indicates whether or not a connection between a kingpin of a fifth wheel trailer and a fifth wheel hitch of a towing vehicle has been reliably executed.

A fifth wheel trailer typically has a horizontally-oriented hitch plate with a cylindrically-shaped kingpin depending downwardly therefrom. In use, the hitch plate is supported by, and rotates relative to, an upper plate of the hitch head. Due to the friction that is typically generated between the hitch plate and the hitch head, prior art fifth wheel hitches need a substantial amount of a greasy lubricant openly applied to the abutting surfaces which, unfortunately, creates a less than desirable environmental issue.

What is needed is a fifth wheel hitch with a hitch head having an upper plate constructed of a material which substantially minimizes or entirely eliminates the need for such a lubricant.

SUMMARY OF THE INVENTION

The improvements of the present invention for a fifth wheel hitch for connecting a fifth wheel trailer having a kingpin to a towing vehicle are structured and configured to be easily uninstalled into separate, relatively light-weight modules, to then be conveniently transported, such as manually or by automobile, for example, for reassembly and reinstallation on another towing vehicle. The fifth wheel hitch includes a base assembly mounted to the bed of a towing vehicle, an intermediate assembly mounted to the base assembly, and a hitch head assembly mounted to the intermediate assembly to tilt about a horizontally-oriented, fore-and-aft axis and a horizontally-oriented transverse axis.

The intermediate assembly is selectively displaceable in a fore-and-aft direction relative to the bed of the towing vehicle, and includes a pair of opposing upright members which are selectively and angularly positionable relative to the bed of the towing vehicle. The upright members are also selectively adjustable in length and include shock-absorbing mechanisms to responsively cushion the hitch head assembly during towing operations.

The hitch head assembly includes a body member having a bearing plate constructed of ultra high density polyethylene material; a throat for receiving a kingpin of a fifth wheel trailer; a latching and locking mechanism including a latch lever with a lever orifice, a lock lever with a lock orifice, a locking pin, a hook, a shoulder; a pair of opposing, biased jaws pivotally connected to the body member, wherein the jaws include mated intermeshing teeth, The latching and locking mechanism is structured and configured to clearly and positively alert a user whether or not the fifth wheel hitch is properly connected to the kingpin.

The fifth wheel hitch includes a connecting mechanism for connecting the fifth wheel hitch to a gooseneck ball hitch mounted to the bed of the towing vehicle.

PRINCIPAL OBJECTS AND ADVANTAGES OF THE INVENTION

Principal objects and advantages of the present invention include: providing a fifth wheel hitch which clearly and positively indicates whether or not a connection between a kingpin of a fifth wheel trailer and a fifth wheel hitch of a towing vehicle has been reliably executed; providing such a fifth wheel hitch with a hitch head assembly having an upper plate constructed of a material which substantially minimizes or entirely eliminates the need for applying a lubricant between the trailer hitch of the fifth wheel trailer and the fifth wheel hitch of the towing vehicle; and generally providing such a fifth wheel hitch that is reliable in performance, capable of long-lasting life, and particularly well adapted for the proposed usages thereof.

Other objects and advantages of this invention will become apparent from the following description taken in conjunction with the accompanying drawings wherein are set forth, by way of illustration and example and without limitation, certain embodiments of this invention.

BRIEF DESCRIPTION OF THE DRAWING FIGURES

FIG. 5 is a schematic representation of a top plan view of the hitch head assembly with the bearing plate removed for purposes of clarity, showing the latch lever and jaws of the fifth wheel hitch in a latched, kingpin-receiving configuration.

FIG. 6 is a perspective, schematic representation showing the latch lever of the fifth wheel hitch in the latched, kingpin-receiving configuration.

FIG. 7 is a perspective, schematic representation of a maneuvering slot for the latch lever of the fifth wheel hitch.

DETAILED DESCRIPTION OF THE INVENTION

Figure 1:
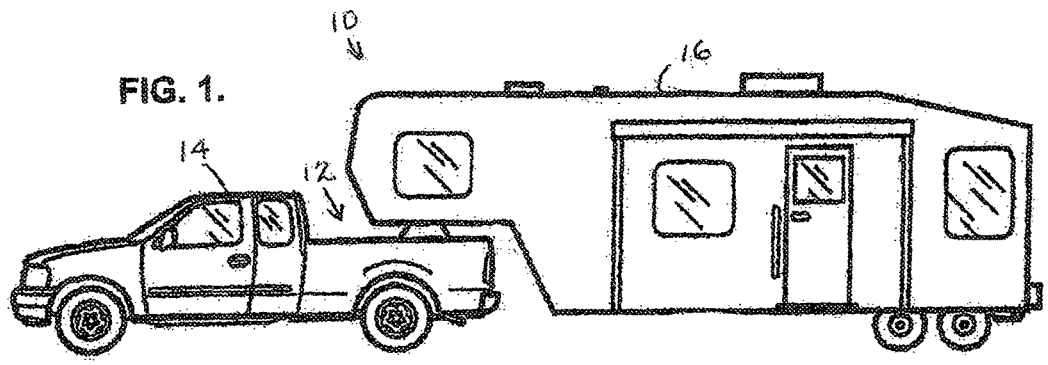
FIG. 1 is a schematic representation of a fifth wheel trailer connected to a fifth wheel hitch mounted on the bed of a towing vehicle, according to the present invention.

As required, embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a fifth wheel hitch 10 mounted on a bed 12 of a towing vehicle 14 for connecting a fifth wheel trailer 16 to towing vehicle 14, in accordance with the present invention as shown in FIGS. 1 through 9. The fifth wheel hitch 10 is structured and configured to be easily uninstalled into separate, relatively light-weight modules, to then be conveniently transported, such as manually or by automobile for example, for reassembly and reinstallation on another towing vehicle.

Figure 2:
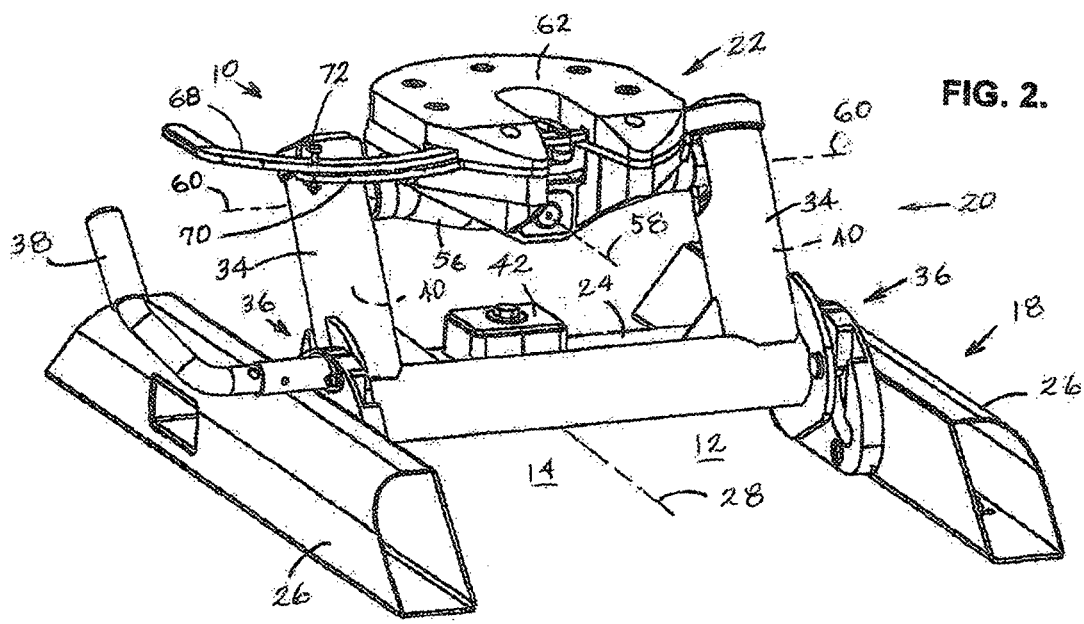
FIG. 2 is a perspective, schematic representation of the fifth wheel hitch showing a base assembly, an intermediate assembly, and hitch head assembly thereof, according to the present invention.

The fifth wheel hitch 10 includes a base assembly 18, an intermediate assembly 20, and a hitch head assembly 22, as shown in FIG. 2. The base assembly 18 generally includes a crossbar 24 connecting a pair of opposing rails 26 mounted on bed 14, wherein the rails 26 are oriented parallel to a longitudinal axis 28 of the towing vehicle 14.

The intermediate assembly 20, which generally includes an opposing pair of upright members 34, is mounted to the base assembly 18, such as by pivot mechanisms 36 or other suitable arrangement. The intermediate assembly 20, in conjunction with the base assembly 18, enables selective forward and rearward displacement of the hitch head assembly 22 relative to bed 12. The pivot mechanisms 36 in conjunction with a pivot lever 38 enables selective angular displacement of the upright members 34 relative to bed 12 of the towing vehicle 14.

Such displacement, generally in a range of approximately eleven inches for example, enables selective fore and aft positioning of the hitch head assembly 22 to thereby prevent the fifth wheel trailer 16 from inadvertently impacting the cab of the towing vehicle 14 during towing operations, particularly for towing vehicles 14 having short beds. Such displacements can be easily and temporarily accomplished when attempting to negotiate a turn having a tight turning radius, such as when parking a fifth wheel trailer 16 in a crowded trailer park for example Also, the upright members 34 are selectively extendable such that the hitch head assembly 22 is sufficiently elevated above bed 12 of the towing vehicle 14 wherein the foremost portion of the fifth wheel trailer 16 is supported above various features of the towing vehicle 14, such as the sides and tailgate of bed 12 for example.

Preferably, the upright members 34 include shock-absorbing mechanisms 40, such as springs or other suitable resilient mechanisms, for example, to responsively cushion the hitch head assembly 22, during towing operations of the fifth wheel trailer 16.

For applications where the towing vehicle 14 has a hitch ball (not shown) mounted on bed 12 for connecting to a gooseneck trailer (not shown), the fifth wheel hitch 10 may include a connecting mechanism 42 fixedly secured to the fifth wheel hitch 10 and structured to securely attach the fifth wheel hitch 10 to the unshown hitch ball.

Figure 3:
FIG. 3 is a schematic representation of the front end of a fifth wheel trailer showing a kingpin and hitch plate thereof.
Figure 4:
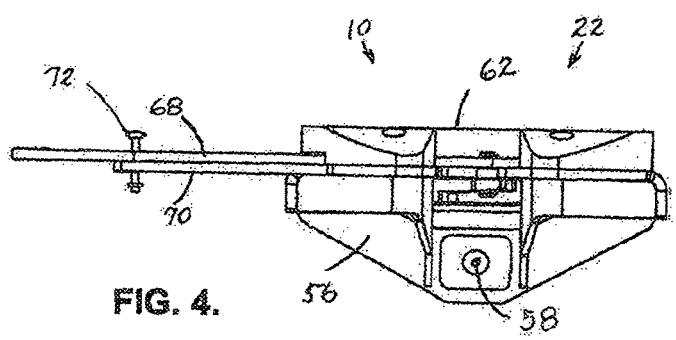
FIG. 4 is a schematic representation of a rear view of the hitch head assembly removed from the intermediate assembly and showing a bearing plate, a latch lever, a lock lever, and a fore-and-aft tilting axis between a body of the hitch head assembly and the intermediate assembly.

FIG. 3 is a schematic representation of the front end of a typical fifth wheel trailer 16 showing a horizontally-oriented hitch plate 44 and a cylindrically-shaped kingpin 46 extending vertically-downwardly from hitch plate 44 and having an annular groove 48 spaced near distal end 50 thereof.

As schematically shown in FIG. 2, the hitch head assembly 22 includes a body member 56 mounted to the intermediate assembly 20 to pivot about a horizontally-oriented fore and aft axis 58 (see FIGS. 2 and 4) and a horizontally-oriented, transverse axis 60 (see FIG. 2) in a gimbal-like manner to thereby enable the hitch head assembly 22 to automatically adapt to an abutting engagement with hitch plate 44 of a fifth wheel trailer 16 being connected thereto.

As schematically shown in FIGS. 5 through 9, hitch head assembly 22 includes a horizontally-oriented bearing plate 62, a pair of opposing jaws 64, 66, and a latching and locking mechanism 68 including a lock lever 70, a latch lever 72, and a locking pin 74. In use, the hitch plate 44 of the fifth wheel trailer 16 abuttingly engages bearing plate 62 of the fifth wheel hitch 10 of the towing vehicle 14, and the jaws 64, 66 are securely clamped around kingpin 46 in annular groove 48.

In operation as towing vehicle 14 and the fifth wheel trailer 16 negotiate turns, the hitch plate 44 rotates relative to bearing plate 62 about kingpin 46. Due to the friction generated between hitch plate 44 and bearing plate 62, those surfaces are typically greased with an appropriate lubricant to prolong the useful lives thereof. To minimize or eliminate the need for such lubricant, the bearing plate 62 for some applications of the fifth wheel hitch 10 are constructed of an ultra high molecular weight polyethylene substance or other suitable material, which minimizes or entirely eliminates the need for a lubricant.

Figure 8:
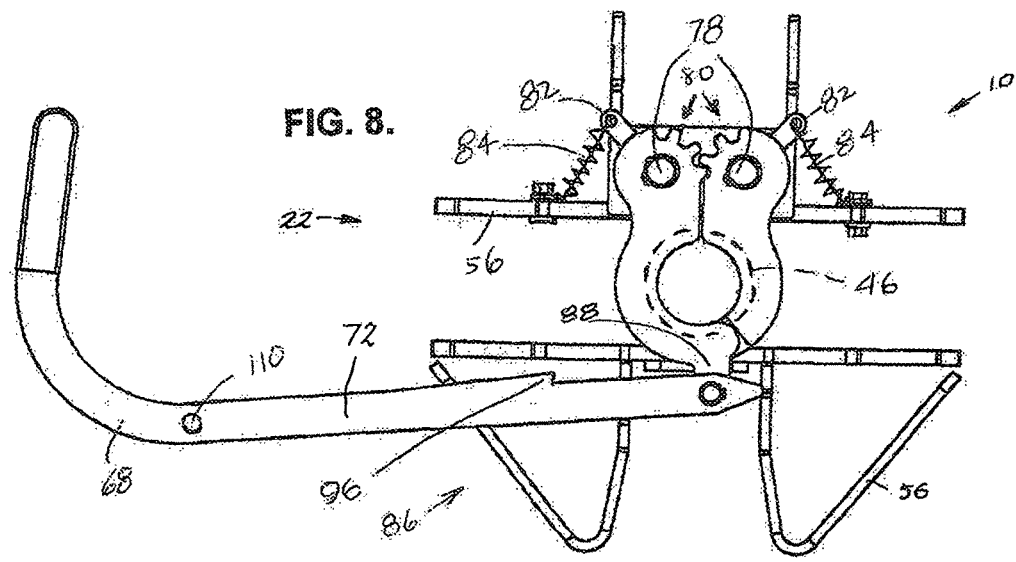
FIG. 8 is a schematic representation similar to that of FIG. 5, but showing the jaws of the fifth wheel hitch in a closed configuration about the kingpin (indicated in dotted lines) of a fifth wheel trailer.
Figure 9:
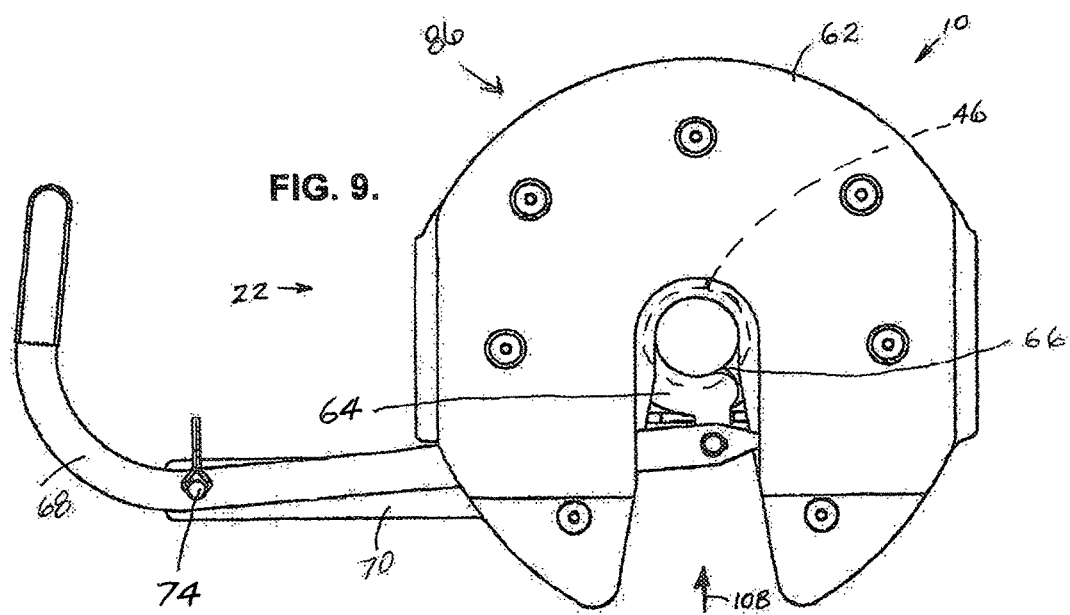
FIG. 9 is a schematic representation of a top plan view of the hitch head showing the fifth wheel hitch in the closed and locked configuration, according to the present invention.

Jaws 64, 66 are mounted to body 56 to thereby rotate in a horizontal plane about pins 78. Jaws 64, 66 include mated intermeshing teeth 80 which ensure that the jaws 64, 66 cooperatively open and close in unison. Each jaw 64, 66 includes a tab 82. A resilient member 84, such as a spring 84 for example, connects a respective tab 82 to the body member 56 to normally bias the jaws 64, 66, if unrestricted, to a closed configuration 86, as shown in FIGS. 8 and 9. A latch tab 88 protrudes rearwardly from jaw 64 as shown in FIG. 5. Pin 90 pivotally connects latch lever 72 to latch tab 88.

Latch lever 70 includes a hook or latch hook 96 (see FIG. 8). Slot 98 (see FIGS. 6 and 7) provides maneuverability for latch lever 70 for engagement of hook 96 with shoulder or latch shoulder 100, as shown in FIGS. 5 and 6, which enables positioning of jaws 64, 66 in a latched, kingpin-receiving configuration 102 whereat the jaws 64, 66 are temporarily restrained. In the latched configuration 102, distal end 104 of latch lever 70 protrudes into the path of kingpin 46, the path being indicated by the arrow designated by numeral 106 of FIG. 5, as kingpin 46 enters throat 108 of the hitch head assembly 22.

A lever orifice 110 in latch lever 72 and a lock orifice 112 in lock lever 70 are located wherein they are alignable when jaws 64, 66 are properly positioned in groove 48 in the closed configuration 86. The inability to insert locking pin 74 through lever orifice 110 and lock orifice 112 provides positive and immediate notice to a user that jaws 64, 66 are not properly clamped around kingpin 46. In that event, the user is thereby alerted to make whatever adjustments are necessary to correct the connection between the fifth wheel hitch 10 and kingpin 46. When jaws 64, 66 are properly clamped around kingpin 46, the user can then secure locking pin 74 in place through orifices 110, 112 with a suitable fastener 114, thereby locking the connection between the lowing vehicle 14 and the fifth wheel trailer 16 in a reliable towable manner.

In an application of the present invention, a towing vehicle 14 is positioned in front of a fifth wheel trailer 16 with the throat 108 of the fifth wheel hitch 10 substantially aligned with kingpin 46, and with hitch plate 44 of the fifth wheel trailer 16 positioned at substantially the same elevation but slightly above that of the bearing plate 62. The latch lever 72 is manually pulled outwardly and maneuvered as needed to engage hook 96 with shoulder 100, thereby placing the fifth wheel hitch 10 in the latched, kingpin-receiving configuration 102.

The towing vehicle 14 is then slowly backed toward the fifth wheel trailer 16 with kingpin 46 following path 106. As the kingpin 46 enters throat 108, distal end 104 of latch lever 72 is nudged out of path 106, thereby unlatching hook 96 from its engagement with shoulder 100. As the kingpin 46 continues on path 106 into throat 108, springs 84 bias jaws 64, 66 against kingpin 46, with jaws 64, 66 encircling kingpin 46 in groove 48. After kingpin 46 is nested in throat 108, the user can then determine whether kingpin 46 is appropriately seated in jaws 64, 66 by checking the alignability of lever orifice 110 with lock orifice 112, by attempting to insert locking pin 74 there through. If locking pin 74 is not so insertable, user then adjusts the connection between the towing vehicle 14 and the fifth wheel trailer 16 until locking pin 74 is so insertable. The user then installs fastener 114 to ensure that locking pin 74 remains inserted through orifices 110, 112, thereby providing both physical and mental assurances to the user that the connection between the fifth wheel trailer 16 and the towing vehicle 14 is securely locked, ready for travel.

It is to be understood that while certain forms of the present invention have been illustrated and described herein, it is not to be limited to the specific forms or arrangement of parts as described and shown.

I claim:

1. In a fifth wheel hitch having a hitch head with a throat and an opposing pair of jaws for connecting to a fifth wheel trailer having a kingpin with an annular groove, the improvement comprising:
    a latch lever having a lever orifice;
    a lock lever having a lock orifice; and
    one jaw of the opposing pair of jaws pivotally connected to the latch lever;
    wherein, if the kingpin has been inserted into the throat of the hitch head, and the jaws are not seated in the groove of the kingpin, the lever and lock orifices are not alignable; and
    wherein, if the kingpin has been inserted into the throat of the hitch head, and the jaws are seated in the groove of the kingpin, the lever and lock orifices are alignable.

2. A fifth wheel hitch as described in claim 1, further comprising: the pair of opposing jaws having intermeshing teeth constructed and configured to ensure that the jaws cooperatively pivot in unison to and from a latched, kingpin-receiving configuration and a closed configuration.

3. A fifth wheel hitch as described in claim 1, further comprising: the hitch head including a bearing plate constructed of ultra high density polyethylene material.

4. A fifth wheel hitch as described in claim 1, further comprising:
    (a) a base assembly mounted to a bed of a towing vehicle;
    (b) an intermediate assembly structured and configured to mount to the base assembly wherein the intermediate assembly is selectably displaceable in a fore-and-aft direction relative to the bed of the towing vehicle;
    (c) a hitch head assembly including a body member, and the throat structured and configured to operably receive the kingpin of the fifth wheel trailer wherein the body member is mounted to the intermediate assembly to automatically tilt about a horizontally-oriented, fore-and-aft axis and a horizontally-oriented transverse axis relative to the bed of the towing vehicle as to thereby properly bear against a hitch plate of a fifth wheel trailer being connected to the fifth wheel hitch;
    (d) wherein the fifth wheel hitch is structured to be easily uninstalled from the towing vehicle, and the hitch head assembly, the intermediate assembly and the base assembly are structured to be disassembled into separate light-weight modules for reassembly and reinstallation on another towing vehicle.

5. A fifth wheel hitch as described in claim 4, further comprising a pair of mounting mechanisms structured and configured to mount the intermediate assembly to the base assembly wherein the angle at which the intermediate assembly is mounted to the base assembly is selectively adjustable.

6. A fifth wheel hitch as described in claim 4, further comprising: a connector mechanism fixedly secured to the base assembly wherein the connector mechanism is structured and configured to releasably secure the fifth wheel hitch to a gooseneck hitch ball mounted to the bed of the towing vehicle.

7. A fifth wheel hitch for connecting a fifth wheel trailer having a kingpin to a towing vehicle, the fifth wheel hitch comprising:
    (a) a base assembly mounted to a bed of the towing vehicle;
    (b) an intermediate assembly mounted to the base assembly wherein the intermediate assembly is structured and configured to be selectably displaceable in a fore-and-aft direction relative to the bed of the towing vehicle; the intermediate assembly also includes a pair of opposing upright members wherein the angle of the upright members relative to the bed of the towing vehicle is selectively adjustable; the upright members further structured and configured to be selectively adjustable in length and to include shock-absorbing mechanisms to responsively cushion the hitch head assembly during towing operations of the fifth wheel trailer;
    (c) a hitch head assembly having a body member including:
        (1) a bearing plate constructed of ultra high density polyethylene material to thereby reduce or entirely eliminate the need to lubricate the bearing plate for towing purposes,
        (2) a throat structured and configured to operably receive the kingpin of the fifth wheel trailer, (3) a pair of opposing jaws pivotally connected to the body member, wherein the jaws include mated intermeshing teeth causing the jaws to cooperatively pivot in unison to and from a kingpin-receiving configuration and a closed configuration, (4) at least one resilient member connecting a respective one of the jaws to the body member wherein the jaws are normally biased to the closed configuration, and (5) a latching and locking mechanism with a latch shoulder, including:
  (A) a latch lever pivotally connected to one of the jaws, wherein the latch lever includes a latch hook, a lever orifice, and a distal end,
  (B) a lock lever including a lock orifice, and
  (C) a locking pin with a fastener; wherein, when the latch hook is engaged with the latch shoulder, the hitch head assembly is temporarily restrained in a kingpin-receiving configuration with the distal end of the latch lever protruding into the entrance of the throat and wherein, as the kingpin enters the throat when the fifth wheel trailer is being connected to the fifth wheel hitch, the kingpin nudges the distal end of the latch lever thereby disengaging the latch hook from the latch shoulder, and allowing the at least one resilient member to bias the jaws against the kingpin; and wherein, if the lever and lock orifices are not alignable when the kingpin is nested in the throat as indicated by the inability to insert the locking pin through the lever and lock orifices, a user is thereby alerted that the jaws are not properly connected to the kingpin and, conversely, if the lever and lock orifices are alignable as indicated by the ability to insert the locking pin through the lever and lock orifices, the user is thereby cognizant that the jaws are properly connected to the kingpin and that securing the locking pin in place with the fastener provides a secure connection for towing, (6) wherein the hitch head assembly is mounted to the intermediate assembly to operably tilt about a horizontally-oriented, fore-and-aft axis and a horizontally-oriented transverse axis to thereby automatically adapt to an abutting engagement with the fifth wheel trailer being connected thereto;

(d) wherein the fifth wheel hitch is structured to be easily uninstalled from the towing vehicle, and the hitch head assembly, the intermediate assembly and the base assembly are structured to be disassembled into separate light-weight modules for reassembly and reinstallation on another towing vehicle.

8. A fifth wheel hitch for connecting a fifth wheel trailer having a kingpin to a towing vehicle, the fifth wheel hitch comprising:

(a) a base assembly mounted to a bed of the towing vehicle;

(b) an intermediate assembly structured and configured to mount to the base assembly wherein the intermediate assembly is selectably displaceable in a fore-and-aft direction relative to the bed of the towing vehicle;

(c) a hitch head assembly including a body member and a throat structured and configured to operably receive the kingpin of the fifth wheel trailer wherein the body member is mounted to the intermediate assembly to automatically tilt about a horizontally-oriented, fore-and-aft axis and a horizontally-oriented transverse axis relative to the bed of the towing vehicle as to thereby properly bear against a hitch plate of a fifth wheel trailer being connected to the fifth wheel hitch;

(d) wherein the fifth wheel hitch is structured to be easily uninstalled from the towing vehicle, and the hitch head assembly, the intermediate assembly and the base assembly are structured to be disassembled into separate light-weight modules for reassembly and reinstallation on another towing vehicle;

(e) wherein the intermediate assembly further comprises an opposing pair of upright members structured and configured to enable selective adjustment of the elevation of the hitch head assembly above the bed of the towing vehicle.

9. A fifth wheel hitch for connecting a fifth wheel trailer having a kingpin to a towing vehicle, the fifth wheel hitch comprising:

(a) a base assembly mounted to a bed of the towing vehicle;

(b) an intermediate assembly structured and configured to mount to the base assembly wherein the intermediate assembly is selectably displaceable in a fore-and-aft direction relative to the bed of the towing vehicle;

(c) a hitch head assembly including a body member and a throat structured and configured to operably receive the kingpin of the fifth wheel trailer wherein the body member is mounted to the intermediate assembly to automatically tilt about a horizontally-oriented, fore-and-aft axis and a horizontally-oriented transverse axis relative to the bed of the towing vehicle as to thereby properly bear against a hitch plate of a fifth wheel trailer being connected to the fifth wheel hitch;

(d) wherein the fifth wheel hitch is structured to be easily uninstalled from the towing vehicle, and the hitch head assembly, the intermediate assembly and the base assembly are structured to be disassembled into separate light-weight modules for reassembly and reinstallation on another towing vehicle;

(e) wherein the intermediate assembly further comprises an opposing pair of upright members structured and configured to enable selective adjustment of the elevation of the hitch head assembly above the bed of the towing vehicle;

(f) wherein the upright members including shock-absorbing mechanisms structured and configured to responsively cushion the hitch head assembly during towing of the fifth wheel trailer.

10. A fifth wheel hitch for connecting a fifth wheel trailer having a kingpin to a towing vehicle, the fifth wheel hitch comprising:

(a) a base assembly mounted to a bed of the towing vehicle;

(b) an intermediate assembly structured and configured to mount to the base assembly wherein the intermediate assembly is selectably displaceable in a fore-and-aft direction relative to the bed of the towing vehicle;

(c) a hitch head assembly including a body member and a throat structured and configured to operably receive the kingpin of the fifth wheel trailer wherein the body member is mounted to the intermediate assembly to automatically tilt about a horizontally-oriented, fore-and-aft axis and a horizontally-oriented transverse axis relative to the bed of the towing vehicle as to thereby properly bear against a hitch plate of a fifth wheel trailer being connected to the fifth wheel hitch;

(d) wherein the fifth wheel hitch is structured to be easily uninstalled from the towing vehicle, and the hitch head assembly, the intermediate assembly and the base assembly are structured to be disassembled into separate light-weight modules for reassembly and reinstallation on another towing vehicle;

(e) wherein the intermediate assembly further comprises an opposing pair of upright members structured and configured to enable selective adjustment of the elevation of the hitch head assembly above the bed of the towing vehicle;

(f) wherein the upright members including shock-absorbing mechanisms structured and configured to responsively cushion the hitch head assembly during towing of the fifth wheel trailer;

(g) wherein the upright members being structured and configured to enable selective adjustment of the lengths of the upright members.

11. A fifth wheel hitch for connecting a fifth wheel trailer having a kingpin to a towing vehicle, the fifth wheel hitch comprising:

(a) a base assembly mounted to a bed of the towing vehicle;

(b) an intermediate assembly structured and configured to mount to the base assembly wherein the intermediate assembly is selectably displaceable in a fore-and-aft direction relative to the bed of the towing vehicle;

(c) a hitch head assembly including a body member and a throat structured and configured to operably receive the kingpin of the fifth wheel trailer wherein the body member is mounted to the intermediate assembly to automatically tilt about a horizontally-oriented, fore-and-aft axis and a horizontally-oriented transverse axis relative to the bed of the towing vehicle as to thereby properly bear against a hitch plate of a fifth wheel trailer being connected to the fifth wheel hitch;

(d) wherein the fifth wheel hitch is structured to be easily uninstalled from the towing vehicle, and the hitch head assembly, the intermediate assembly and the base assembly are structured to be disassembled into separate light-weight modules for reassembly and reinstallation on another towing vehicle;

(e) wherein the hitch head assembly further comprises:

(1) a body member having a latch shoulder, and a lock lever with a lock orifice;

(2) a pair of opposing jaws pivotally connected to the body member, wherein the jaws include mated intermeshing teeth causing the jaws to cooperatively pivot in unison to and from a kingpin-receiving configuration and a closed configuration;

(3) at least one resilient member connecting a respective one of the jaws to the body member wherein the jaws are normally biased to the closed configuration;

(4) a latch lever pivotally connected to one of the jaws, wherein the latch lever includes a latch hook, a lever orifice, and a distal end; and (5) a locking pin with a fastener;

(6) wherein, when the latch hook is engaged with the latch shoulder, the hitch head assembly is temporarily restrained in a kingpin-receiving configuration with the distal end of the latch lever protruding into the entrance of the throat; and (7) wherein, as the kingpin enters the throat when the fifth wheel trailer is being connected to the fifth wheel hitch, the kingpin nudges the distal end of the latch lever thereby disengaging the latch hook from the latch shoulder, and allowing the at least one resilient member to bias the jaws against the kingpin; and (8) wherein, if the lever and lock orifices are not alignable when the kingpin is nested in the throat as indicated by the inability to insert the locking pin through the lever and lock orifices, a user is thereby alerted that the jaws are not properly connected to the kingpin and, conversely, if the lever and lock orifices are alignable as indicated by the ability to insert the locking pin through the lever and lock orifices, the user is thereby cognizant that the jaws are properly connected to the kingpin and that securing the locking pin in place with the fastener provides a secure connection for towing.

* * * * *